United States Patent
Lu et al.

(10) Patent No.: US 6,611,590 B1
(45) Date of Patent: Aug. 26, 2003

(54) ENTERPRISE-WIDE INTELLIGENT CALL CENTER ROUTING

(75) Inventors: David T. Lu, Broomfield, CO (US); Jean F. Zaleckas, Shark River Hills, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/408,381

(22) Filed: Sep. 29, 1999

Related U.S. Application Data
(60) Provisional application No. 60/146,399, filed on Jul. 30, 1999.

(51) Int. Cl.[7] .................................................. H04M 5/00
(52) U.S. Cl. ............................. 379/265.09; 379/265.12
(58) Field of Search ........................ 379/265.09, 265.12

(56) References Cited

U.S. PATENT DOCUMENTS

| | | | | |
|---|---|---|---|---|
| 6,134,530 A | * | 10/2000 | Bunting et al. | 379/220.01 |
| 6,385,646 B1 | * | 5/2002 | Brown et al. | 345/700 |
| 6,393,018 B2 | * | 5/2002 | Miloslavsky | 370/270 |

OTHER PUBLICATIONS

Patent No. 5878130, filed on Apr. 28, 1998 and issued on Mar. 2, 1999 to G. Wayne Andrews; Steven H. Webber; James P. Kelly; Lawrence E. Johnson; Jerry A. Stern; Vincent J. Milano, Jr. and Charles R. Davis.

Patent No. 5,633,924, filed on Dec. 11, 1995 and issued on May 27, 1997 to Steven T. Kaish; Eugene P. Mathews; Nigel G. Matson; Carlos A. Perea; George J. Ryva; James B. Shepard; Smita P. Sheth and Robert J. Thornberry, Jr.

Patent No. 5,884,032, filed on Sep. 25, 1995 and issued on Mar. 16, 1999 to Thomas Howard Bateman; Bruce Edward Kierstead; William Alexander Noble; Timothy Lee Curry; John Alan Lockett; Laurie Edward Mersereau and Robert James Ouellette.

Patent No. 5,787,160, filed on Jun. 6, 1996 and issued on Jul. 28, 1998 to Christine S. Chaney; Frances D.E. Taylor and Cristobal A. Torres.

Patent No. 5,787,163, filed on Oct. 30, 1996 and issued on Jul. 28, 1998 to Frances D.E. Taylor; Christine S. Chaney and Christobal Alejandro Torres.

\* cited by examiner

*Primary Examiner*—Ahmad F. Matar
*Assistant Examiner*—Rasha S AL-Aubaidi
(74) *Attorney, Agent, or Firm*—Birch, Stewart, Kolasch & Birch, LLP

(57) ABSTRACT

Internet Call Center quality of service is enhanced by directing all callers' browser-initiated contact requests to a single Internet Interface Controller. Upon receiving a caller's contact request, ruled-based routing is applied at the Internet Interface Controller to determine the Call Center, from among the Enterprise-wide domain of Call Centers, best suited for servicing the call. A pre-routed contact request is created establishing the Call Center best suited for servicing the call as the appropriate destination Call Center and a session is established between the caller and the Call Center best suited for servicing the call.

25 Claims, 7 Drawing Sheets

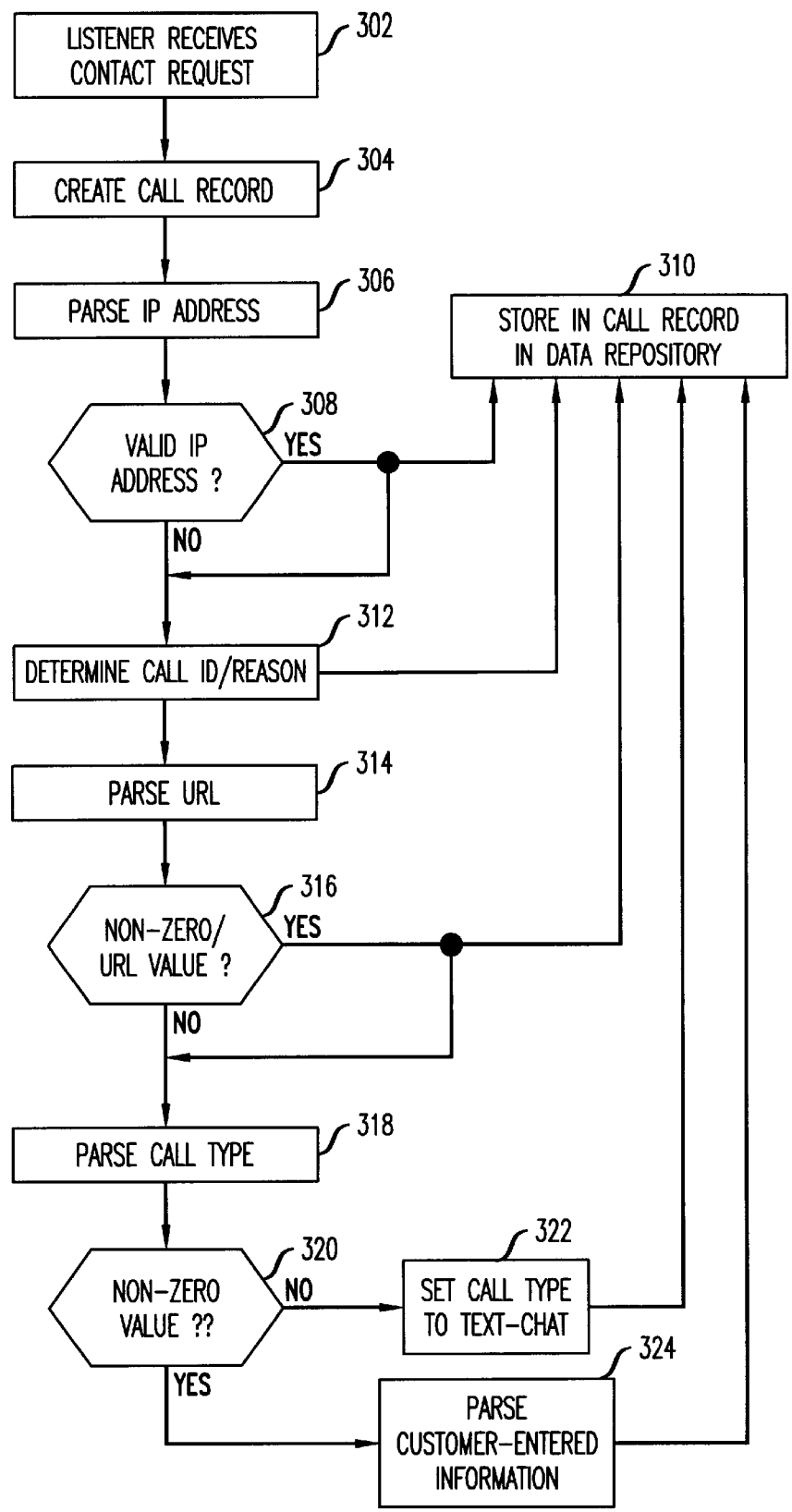

FIG. 6

| CALL ID/REASON ROUTING DIRECTORY ||
|---|---|
| REASON | SITE |
| 1 | A |
| 2 | B |
| 3 | C |
| ⋮ | ⋮ |
| n | ZZZ |

FIG. 7

| INITIATING URL ROUTING DIRECTORY ||
|---|---|
| URL | SITE |
| XYZ | A |
| CEF | B |
| GHJ | C |
| ⋮ | ⋮ |
| n | ZZZ |

FIG. 8

| CUSTOMER-ENTERED INFORMATION ROUTING DIRECTORY ||
|---|---|
| CUSTOMER-ENTERED INFORMATION | SITE |
| X11 | A |
| X12 | B |
| X13 | C |
| ⋮ | ⋮ |
| Xxx | ZZZ |

ENTERPRISE-WIDE INTELLIGENT CALL CENTER ROUTING

CROSS REFERENCES TO RELATED APPLICATIONS

This application claims the benefit of U.S. Provisional Application No. 60/146,399, filed on Jul. 30, 1999.

FIELD OF THE INVENTION

The present invention relates to call center packet routing, and more particularly to electronic-commerce and other consumer-based services conducted via Internet Call Centers.

BACKGROUND OF THE INVENTION

As Internet-based services continue to evolve, many businesses and other Enterprises are aggressively developing Internet-based access methods through which their callers and customers may access their services, request information, and collaborate with agents utilizing voice and data applications in concert with one another. These sessions are typically initiated from the caller's web-browser via a contact request. Many Enterprises, because they are extremely large, because they experience a substantial call capacity, or because they are geographically diverse, maintain more than one Internet Call Center to process callers' browser-initiated contact requests. Enterprises which maintain multiple Internet Call Centers are highly motivated to provide the most effective and efficient Call Center services possible—Enterprise-wide—since there is a strong correlation between quality of customer service and the quantity of repeat business. Quality of service, in turn, is dependent upon directing callers to the appropriate web-based applications, the appropriate Call Center, and the appropriate agent for servicing a call. However, current browser-launched applications are reliant upon static routing mechanisms, in which the caller typically clicks on a graphical user-interface button associated with a particular Enterprise web-page and is directed to a predefined Call Center, application, or other service; regardless of whether the caller would receive improved quality of service from an alternative Call Center within the Enterprise-wide group of Call Centers.

SUMMARY OF THE INVENTION

Internet Call Center quality of service is efficiently and effectively enhanced by directing all caller' browser-initiated contact requests to a single Internet Interface Controller. Upon receiving a caller's contact request, rules-based routing is applied at the Internet Interface Controller to determine the Call Center, from among the Enterprise-wide domain of Call Centers, best suited for servicing the call. A pre-routed contact request is created identifying the Call Center best suited for servicing the call as the appropriate destination Call Center and a call session is then established between the caller and the appropriate destination Call Center.

The rules bases, with which the Internet Interface Controller determines individual routing decisions, is shaped according to the specific needs, priorities, and capabilities of the Enterprise's Call Centers. In one example of an application of the present invention in which it is desired to minimize the total amount of time the caller waits in queue before an agent becomes available, the caller is directed to the Call Center, from among the Enterprise-wide domain of Call Centers, having the shortest queue of callers on hold. In a second example illustrating the application of the present invention, when it is imperative to utilize the special talents or expertise of an agent or agents available only at a particular Call Center, the caller is directed to that particular Call Center, regardless of other considerations, such as length of caller queue.

BRIEF DESCRIPTION OF THE DRAWINGS

A more complete understanding of the present invention may be obtained from consideration of the following description in conjunction with the drawings in which:

FIG. 3 is a flow diagram of an exemplary processing method utilized by the Internet Interface Controller (IIC) in determining a call request route type, in accordance with the principles of the present invention;

FIG. 6 is an illustration of an exemplary call reason data field structure maintained by the Internet Interface Controller (IIC) 170, in accordance with the principles of the present invention;

FIG. 7 is an illustration of an exemplary URL data field structure maintained by the Internet Interface Controller (IIC) 170, in accordance with the principles of the present invention; and FIG. 8 is an illustration of an exemplary customer-entered information data field structure maintained by the Internet Interface Controller (IIC) 170, in accordance with the principles of the present invention.

DETAILED DESCRIPTION

Figure 1:
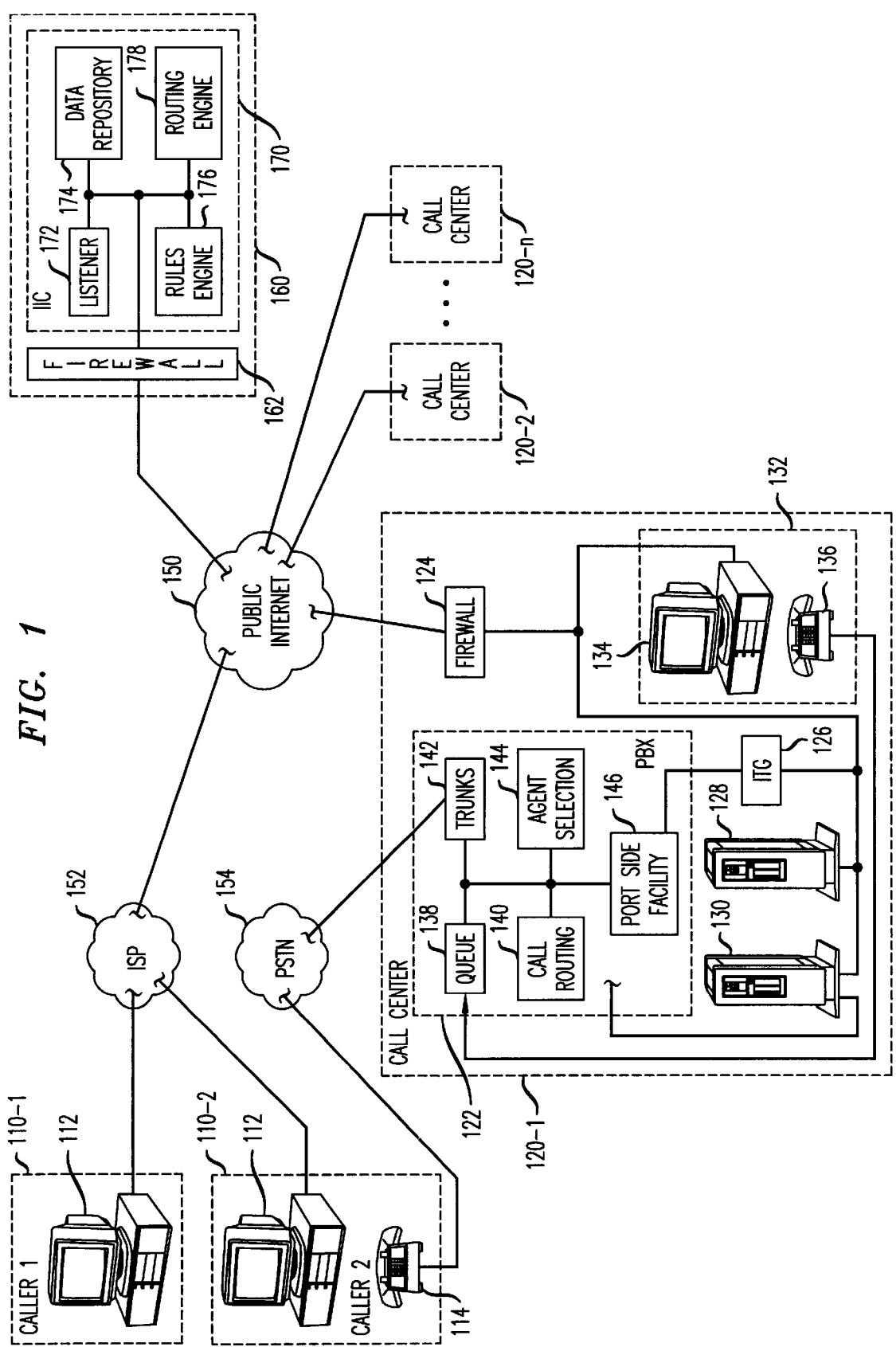
FIG. 1 is a block diagram illustrating an exemplary architectural configuration of an Internet Interface Controller (IIC) utilized to establish an Enterprise-wide Intelligent Internet routing scheme among a plurality of Internet call centers or Internet call termination points, in accordance with the principles of the present invention.
Figure 2A:
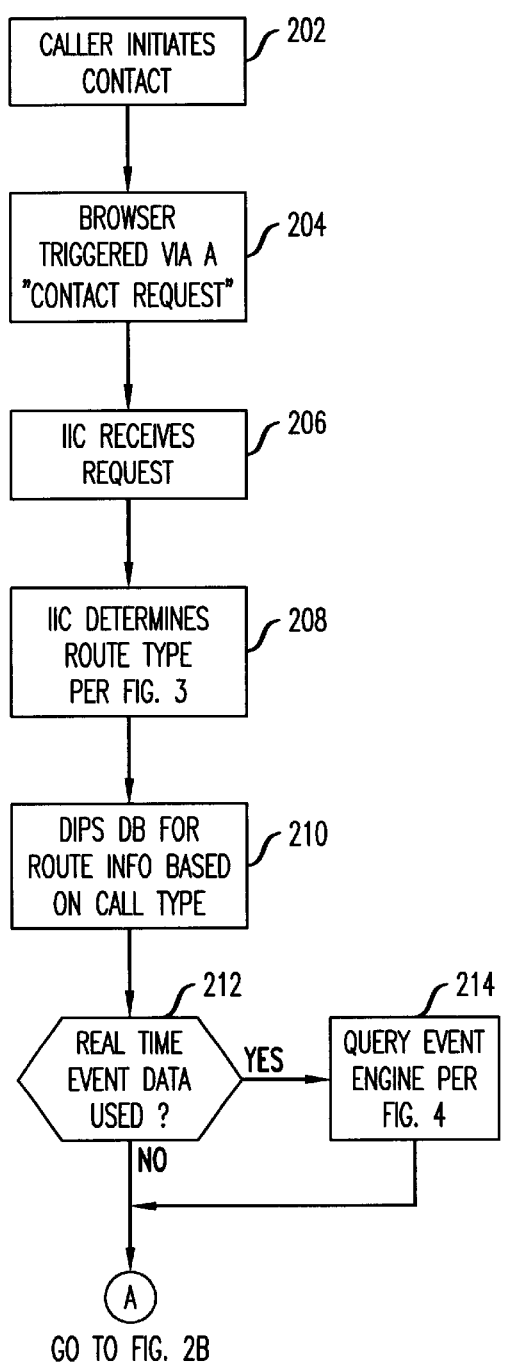
FIGS. 2a–d represent an exemplary end-to-end call flow sequence utilizing the Internet Interface Controller (IIC), in accordance with the principles of the present invention.
Figure 2B:
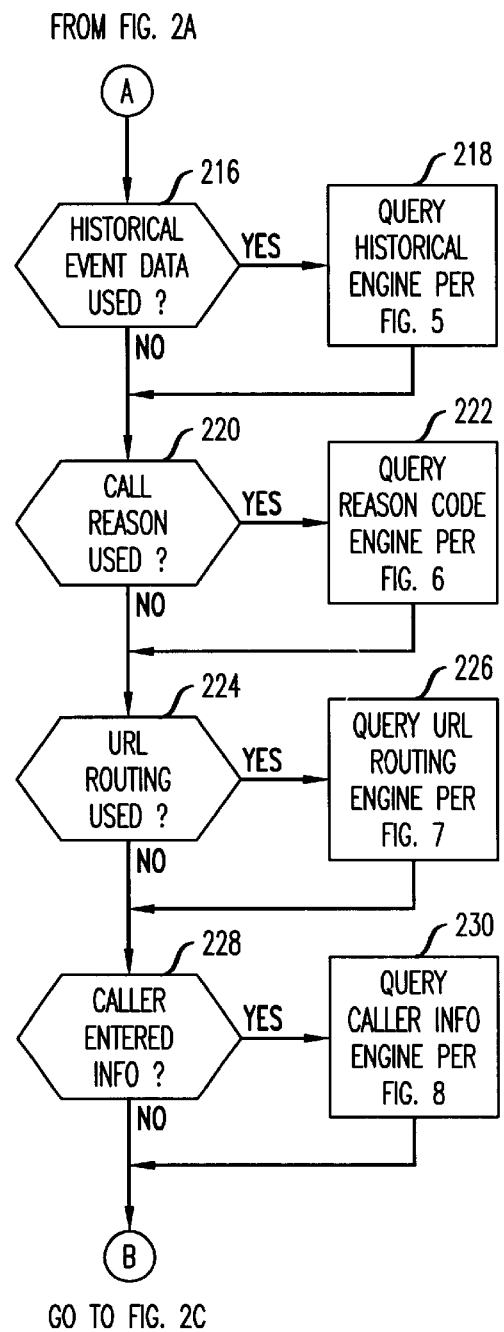
Figure 2C:
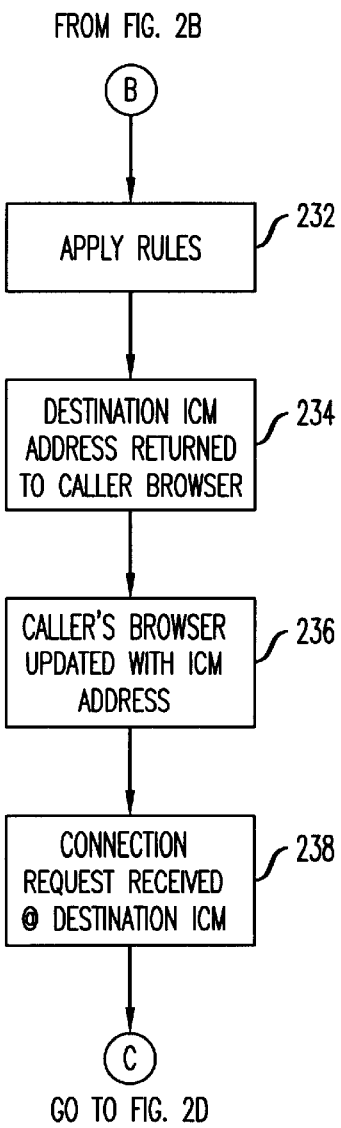
Figure 2D:
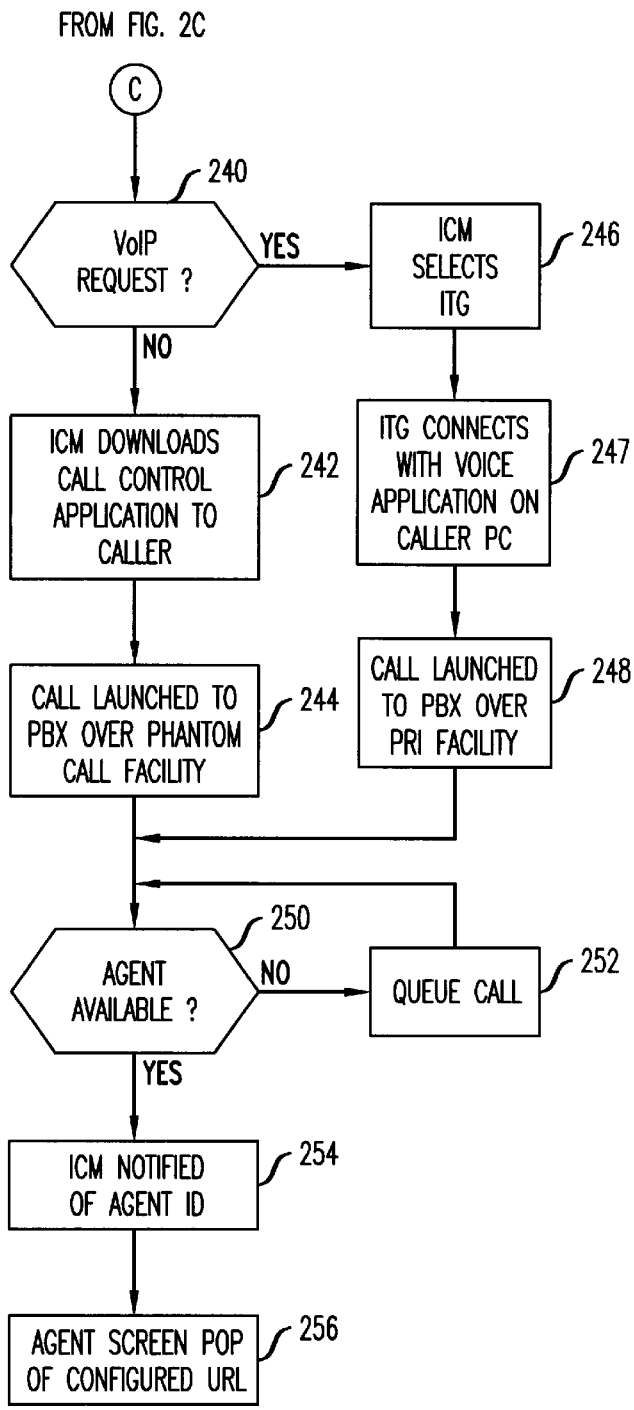

FIG. 1 is a block diagram illustrating an exemplary architectural configuration of an Internet Interface Controller (IIC) 170 utilized to establish an Enterprise-wide Intelligent Internet routing scheme among a plurality of Internet call centers or Internet call termination points, in accordance with the principles of the present invention. A plurality of customers, information seekers, collaborators, and consumers are shown, illustrated as callers 110, each of whom may alternatively wish to access an agent or service associated with one or more call centers 120 which represent an Enterprise-wide network of call centers. Although callers 110 are shown accessing call centers 120 via the public Internet 150, and the Internet Interface Controller 170 and individual call centers 120 also communicate via the public Internet 150, it would be apparent to those skilled in the art that the principles of the present invention would be equally applicable over any packet-based network for the purpose of intelligent cooperation between individual call centers which comprise an Enterprise-wide network of call centers.

Illustrated are two types of callers 110. Caller1 110-1 represents a caller utilizing only a data terminal, such as a PC 112, to establish a data connection with a call center 120 over the public Internet 150, typically via a caller-selected Internet Service Provider (ISP) 152. It is understood that other data terminals able to access the Internet with browser capabilities, such as personal digital assistants, are also contemplated as equivalents to a caller PC 112. Caller2 110-2 represents a caller also utilizing a data terminal, such as a PC 112, coupled to the public Internet 150 via an ISP 152, but Caller2 is additionally configured with a telephone 114 for accessing the Public Switched Telephone Network (PSTN) 154. For the dual purposes of brevity and clarity, Caller1 110-1 and Caller2 110-2 will be collectively described as the caller 110 for the remainder of this description, except when differentiation between each caller's capabilities is critical to understanding the principles of the present invention. Similarly, although a total of n Internet call centers 120 are illustrated (call centers 120-1, 120-2, ..., 120-n), subsequent reference will be made to a single call center 120 except when differentiation between individual call centers, within the domain of the Enterprise-wide system of call centers, is needed for describing and understanding the principles of the present invention.

Now, assume the caller 110 initiates a session with an agent at one of the call centers 120 in the Enterprise-wide system of call centers. At least three unique call session types are contemplated: a Voice over Internet Protocol (VoIP) session, a text-chat session, or a call-back session. A VoIP session connection to an Enterprise's website is initiated from a multimedia PC 112 running a VoIP application. A text-chat session connection may be utilized when accessing the Enterprise's website from a PC without multimedia capabilities, therefore resulting in a purely text and data exchange of communication with the agent, instead of a VoIP conversation. A call-back session is initiated by the caller 110 to request that an agent call back the caller 110, typically because either the wait for an available agent is too long, IP network congestion is too great, the caller prefers to utilize a telephone for a particular transaction or information exchange, the caller has only one telephone line, or merely because the time at which the call-back session is initiated is inconvenient for the caller 110.

While using a web browser to access an Enterprise's website (not shown), the caller 110 selects, in one exemplary scenario, the VoIP communication option and a CALL_US request from a web-page associated with the Enterprise's website. The CALL_US request is a trigger which executes a Common Gateway Interface (CGI) script which captures pertinent information and parameters such as the call type and the web-page Universal Resource Locator (URL) from which the CGI was triggered, inter alia. The CGI script is preprogrammed with the address of a call termination site, so the caller's request, along with the pertinent information and parameters, are delivered to the call termination site via the ISP 152 and public Internet 150.

In accordance with the prior art, the call termination site is a pre-selected one of the plurality of Enterprise's call centers. Each call center 120 is typically comprised of an Internet Call Manager (ICM) server 128, a Private Branch Exchange (PBX) 122, a telephony server (T-server) 130, an Internet Telephony Gateway (ITG) 126, and at least one agent workstation 132. The agent workstation is typically comprised of an agent's workstation PC 134 and an agent's telephone 136. The functional block architecture of a typical PBX 122 is illustrated as including a port side facility 146, an agent selection engine 144, a call queue buffer 138, a call routing engine 140, and trunk lines 142 for connection with the PSTN 154. Also shown in the instant embodiment illustrated in FIG. 1 is an optional, but frequently used, Enterprise firewall 124. At the receiving call center 120, the request is received by the Internet Call Manager (ICM) 128. The ICM 128 interprets the pertinent information and parameters, such as the launching URL and the selected call type (e.g.—VoIP, text-chat, call-back, etc.), checks for agent availability within that call center, and communicates this information with the call center's telephony server (T-server) 130. The T-server 130 is coupled and interfaced with the call center PBX 122, over an incorporated Computer Telephony Integration (CTI) link. The CTI link in any PBX or switching object is used to monitor all the call activity occurring at the PBX 122 and report each call activity event—such as call receipt, agent going on-hook, agent going off-hook, etc.—to the T-server 130. The T-server 130, in response, updates the ICM 128 as to the current status of the various agents at the call center 120 and other call activity events. The ICM 128 maintains a record of the various activities and parameters associated with the call center which it services, such as: the number of calls in queue, the number of available agents, the particular expertise and qualifications of the various agents, etc. Once a CALL_US request is received by the ICM 128 and the request is recognized as a VoIP call type request, the ICM 128 sends a message to trigger the Internet Telephony Gateway (ITG) 126 to set up the associated call to an appropriate agent within the call center, over the ISDN/PRI facility though which the ITG 126 is connected to the PBX 122. Agents, configured with multimedia workstations 132 having data and telephony capabilities, are able to service calls via telephony, data (such as text), a combination of telephony and data, collaboration, web-page pushes, etc.

Although the ICM 128 is able to direct a call to the appropriate agent or resource within its associated call center, call centers cannot currently direct a call to the best Enterprise agent or resource across all of the Enterprise's call centers. For example, a CALL_US request may be received by call center 120-1, the initiating caller 110 needing to interface with an agent. It may well be that an agent having a particular talent or expertise would best handle the transaction, that no agent having this particular talent or expertise is available at call center 120-1, but that an agent that does possess this particular talent or expertise is available at another call center, say call center 120-2, within the Enterprise.

Advantageously, the present invention utilizes a new Internet Interface Controller (IIC) 170 as the initial call termination site of a CALL_US request, instead of a particular, pre-determined call center within the Enterprise of call centers. Consequently, upon receiving a CALL_US request, the IIC determines the agent and the call center best suited to service a particular call, considered Enterprise-wide, and initializes a call session between the caller 110 and the best suited call center 120. In the instant example, call center 120-2 was assumed to have an agent that possesses a talent or expertise best suited for servicing the call and therefore, a call session is established between the caller and the specified agent at call center 120-2.

Although the Internet Interface Controller (IIC) 170 is illustrated as being implemented using a network server, it would be apparent to those skilled in the art that the underlying principles of the present invention may be implemented over any microprocessor device accessing a storage device and coupled to exchange information over a network to individual call centers 120. In the exemplary embodiment illustrated. in FIG. 1, an Enterprise site 160 hosting the IIC 170 is coupled to the Internet 150 through an Enterprise firewall 162, for information exchange with call centers 120-1 through 120-n. It would also be apparent to those skilled in the art that the IIC 170 may be integrated within one of the existing Enterprise call centers 120, or within a remote but shared Enterprise site which does not maintain a call center 120, or at a location dedicated for the purpose of hosting the IIC 170, or maintained as a service provided by a non-Enterprise service provider, or any other location and configuration that is capable of providing the same function and services as described in accordance with the principles of the present invention.

An exemplary Internet Interface Controller (IIC) 170 architecture is comprised of four interrelated basic functional components: a Listener 172, a Data Repository 174, a Rules Engine 176, and a Routing Engine 178. In accordance with the principles of the present invention, a CALL_US request is received by the Internet Interface Controller (IIC) 170 at the Listener 172 (instead of at an individual call center 120, as characterized by the prior art method). This is accomplished by designating the packet address associated with the CALL_US request as the IIC 170 address instead of the address of a particular Enterprise call center 120. The Listener 172 then parses the CALL_US request and supplies the Routing Engine 178 with the parsed data. The Routing Engine 178 receives the request, determines the most appropriate call center to which it should forward the request in accordance with rules-based parameters provided by the Rules Engine 176, and forwards the request to the appropriate call center 120. The Rules Engine 176 provides to the Routing Engine 178 the various programmed rules to be used to make a routing decision. The Routing Engine 178 determines the appropriate call center based upon various routing priorities as assigned by Enterprise system management and incorporated within the rules supplied by the Rules Engine 176, as interpreted by the Routing Engine 178. For example, routing decisions may be based on one or more of the following characteristics, taken either singly, or in combination with the assistance of a weighting algorithm to prioritize the various characteristics: marketing data, agent expertise, historical or quantified real-time call center conditions (i.e.—call center call density, call length, etc.), caller entered information, URL of the web-page from which request is initiated. This list of characteristics is presented as merely illustrative, and should not be construed as exclusive. Accordingly, yet other characteristics and parameters are also contemplated for use by the Routing Engine 176 for making routing decisions, within the context and principles embodying the present invention.

The Data Repository 174 is periodically provided with updated information from the Internet Call Manager (ICM) 128 of each individual call center 120 regarding call record events, resource capabilities, resource utilization, agent expertise, agent availability, etc. Therefore, the Internet Interface Controller (IIC) 170 functions to direct CALL_US requests from callers 110 (and the subsequently established calls) to the best, most efficient and efficacious call center or call termination point from a plurality of Enterprise call centers 120-1 through 120-n. For example, a CALL_US request including a request for a Spanish-speaking agent may supersede all other considerations if a Spanish-speaking agent is only available at one particular Enterprise call center, regardless of that call center's call density, capacity, geographic proximity, agent expertise, etc. Considering a second example, if Enterprise management and system administrators decide that a reservations request must be handled with priority over all other types of calls, then any CALL_US request initiated from the Enterprise's Reservation web-page (not shown) will be sent to the first available agent at any call center, Enterprise-wide and irrespective of any other call characteristics.

FIGS. 2a–d represent an exemplary end-to-end call flow sequence utilizing an Internet Interface Controller (IIC) 170, in accordance with the principles of the present invention. In accordance with step 202, a caller 110 initiates contact by selecting a "Call Us" button from an Enterprise web-page. In response to the selection, and in accordance with step 204, a CALL_US request Common Gateway Interface (CGI) script, residing on the server and supporting the caller 110 browser interface, is triggered. The CALL_US request, having the IIC 170 address as a destination address, is launched from the caller's PC 112, over the caller's Internet Service Provider (ISP) 152 and the Public Internet 150, and in accordance with step 206 is received by the Listener 172 at the IIC 170. In accordance with step 208, the IIC 170 next determines the appropriate call type.

One exemplary method by which the Listener 172 determines the appropriate call type is illustrated in FIG. 3. In accordance with step 302, the Listener 172 at the Internet Interface Controller (IIC) 170 receives the CALL_US request from the caller 110. In response, and in accordance with step 304, the Listener 172 creates a skeleton call record for the call. The skeleton call record is comprised of empty data fields relating to pertinent call parameters and information, data subsequently being written in the empty data fields as the appropriate parameters and/or information is received, parsed, determined, and analyzed. For example, in accordance with step 306, the Listener parses the source IP address associated with the CALL_US request. In accordance with step 308, the Listener determines if the source IP address is a valid IP address, since not all received packets need have a valid source IP address. If the source IP address is determined to be a. valid IP address, then in accordance with step 310, the source IP address is written to the appropriate data field of the call record stored in memory at the Data Repository 174. However, if no source IP address is available, or if the source IP address is determined to be invalid, then the source IP address is not written to the call record.

Regardless of whether a source IP address is available, or whether the source IP address is a valid IP address, the Listener then determines the call ID/reason associated with the call, in accordance with step 312. This is accomplished by parsing the CALL_US request message to determine the call reason. The call reason is typically attributable to the Enterprise web-page CGI script from which a request is initiated, and then included as a data field within the CALL_US request by way of operation of the initiating CGI script. Once determined, the call ID/reason is written to the appropriate data field of the call record stored in memory at the Data Repository 174, in accordance with step 310.

The Listener then parses the source Universal Resource Locator (URL) from the CALL_US request, in accordance with step 314. A check is performed to determine if the URL is a non-zero value, in accordance with step 316. If the parsed URL is a non-zero value, then the URL value is written to the appropriate data field of the call record stored in memory at the Data Repository 174, in accordance with step 310. A zero or null value URL would indicate that the URL was not included in the CALL_US request, and therefore, a null value URL is not written to the appropriate data field of the call record stored in memory at the Data Repository 174.

Regardless of whether the parsed URL is non-zero or null, in accordance with step 318, the CALL_US request is parsed to determine call type. In an exemplary embodiment of the present invention, the initiating CGI script assigns a predetermined call type value to the call type field if a specific call type is selected by the caller 110, and a null value is assigned if call type is not specified. In accordance with step 320, if the Listener 174 determines that the call type field is a null value, indicating no specified call type, the call type is set to a default text-chat call type, in accordance with step 322. The selection of a text-chat call type is then written to the appropriate data field of the call record stored in memory at the Data Repository 174, in accordance with step 310. If however, the call type value is a non-zero value, then in accordance with step 324, customer-entered information is parsed from the CALL_US request message and written to the appropriate data field of the call record stored in memory at the Data Repository 174, in accordance with step 310. The call record stored within the Data Repository 174 now includes field values representing all of the pertinent information associated with the incoming call. Additionally, other call center definable parameters may also be parsed and stored within the Data Repository, as would be apparent to those skilled in the art.

Returning to FIG. 2, step 210, the Internet Interface Controller (IIC) 170 Routing Engine 178 dips the call record stored within the IIC Data Repository 174, and in conjunction with rules-based input from the IIC Rules Engine 176, determines which Enterprise-wide call center 120 will best service the call. For example, in accordance with step 212, if the Rules Engine 176 is programmed to instruct the Routing Engine 178 not to use real time event data, then the Routing Engine ignores real time event data as a component of the call routing decision. However, if the Rules Engine 176 is programmed to instruct the Routing Engine 178 to use real-time event data, then the Routing Engine operates as an event-driven engine, either exclusively or in combination with other subsequently described routing algorithm components, in accordance with step 214. One exemplary method by which the Rules Engine 176 acquires real-time data so that it may be utilized as a real-time event engine is illustrated in FIG. 4.

Figure 4:
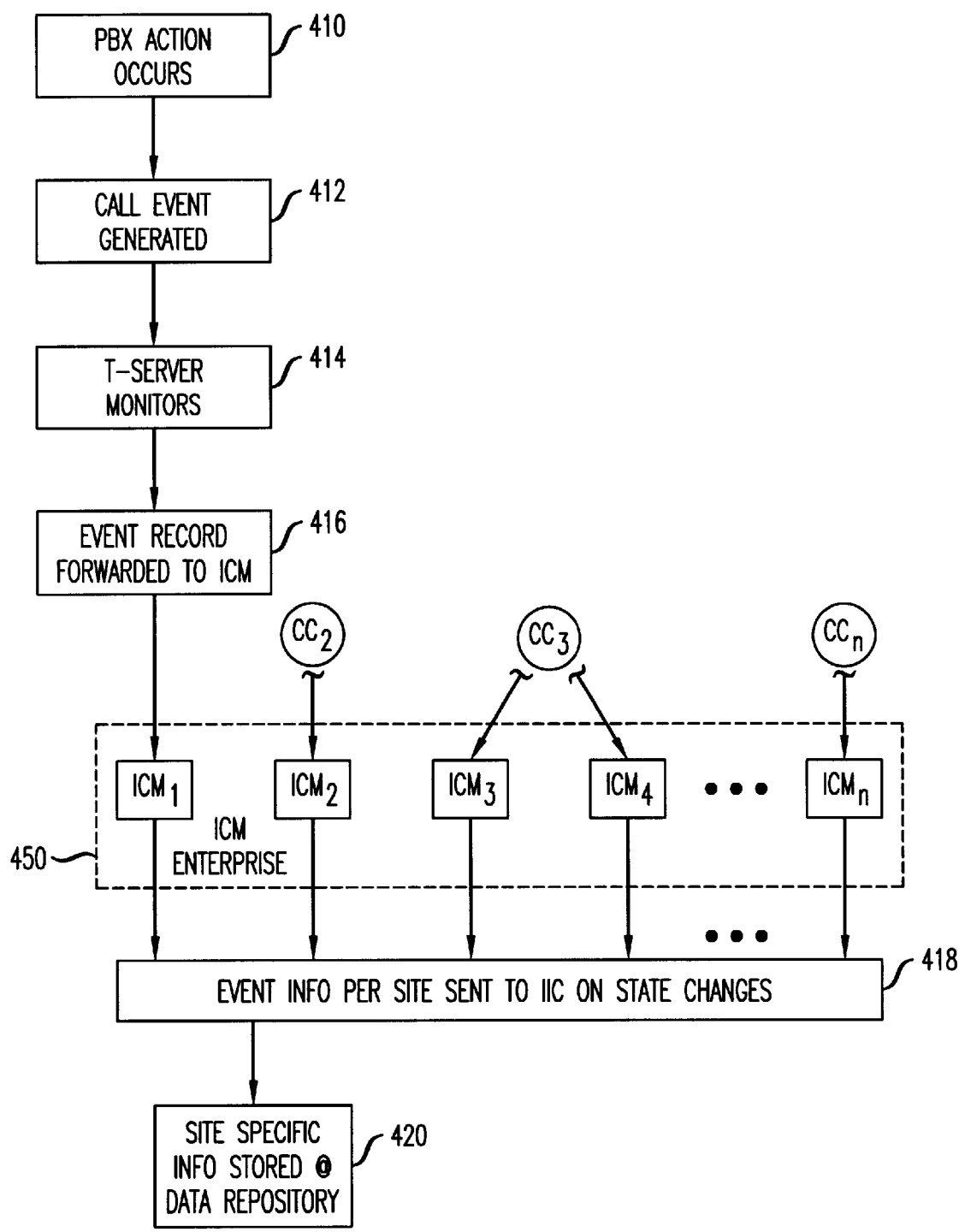
FIG. 4 is a block diagram illustrating an exemplary real-time event engine messaging sequence utilized by the Internet Interface Controller (IIC) in determining call routing to an appropriate Enterprise-wide call center, in accordance with the principles of the present invention.

FIG. 4 is a block diagram illustrating an exemplary real-time event engine messaging sequence utilized by the Internet Interface Controller (IIC) 170 in determining call routing to an appropriate Enterprise-wise call center, in accordance with the principles of the present invention. Real-time event information is real-time data monitored by a respective call center's T-server 130 and reported to the call center's Internet Call Manager (ICM) 128 independently, for each call center 120 within the Enterprise-wide domain of call centers. The events are typically characterized as state changes, or events, which occur at a calling center's PBX 122 or other programmable switch. Some typical real-time events reported to a call center's ICM 128 from the respective call center's T-server 130 include: call center agents logging on or off, a connected call, a call disconnect, number of calls in queue, etc. These examples are illustrative only, and are not intended to be an exhaustive list of state changes reportable to the ICM 128. Other event types currently are, or may be, reported to the ICM 128 as a state change, as would be apparent to those skilled in the art.

Assume, in accordance with step 410, that a PBX state change takes place, such as that a particular agent logs on at a call center PBX 122. This state change causes a PBX call event to be generated, in accordance with step 412. The call center T-server 130 detects the call event in accordance with step 414. Subsequently the call center T-server 130 reports the call event to its ICM, in this particular example, $ICM_1$, in accordance with step 416. Typically, upon receiving the call event notification, an ICM records the occurrence locally within its call history log. In accordance with the principles of the present invention, the ICM additionally reports such state changes to the Enterprise Internet Interface Controller (IIC) 170, in accordance with step 418. Notification of individual call center state changes are detected by the IIC Listener 172 and the information is then stored at the IIC Data Repository 174, in accordance with step 420. The Internet Call Managers (ICMs) for each of the call centers included in the Enterprise-wide domain of call centers are shown collectively as the ICM Enterprise 450. It should be noted that there is not necessarily a one-to-one correspondence between the number of call centers and the number of ICMs. For example, FIG. 4 includes a total of n Internet Call Managers (ICMs), $ICM_1$ through $ICM_n$. $ICM_1$ is illustrated as being dedicated to a single call center having a single PBX. $ICM_2$ is illustrated as managing a single call center as well ($CC_2$). A single call center may be of such size and magnitude that two or more ICMs ($ICM_3$ and $ICM_4$) may administer distinct subsections of a call center ($CC_4$).

Accumulating the real-time event data from each call center, Enterprise-wide, at the IIC 170 allows the IIC to determine the most appropriate call route for each individual call, based upon that real-time data. For example, if the Rules Engine 176 is programmed to value the minimization of caller wait time before an agent responds to a call, then the IIC 170, which possesses real-time information pertaining to the call queues for individual agents at individual call centers, will make a routing decision which minimizes or reduces caller wait time, by routing the call to a call center and an agent having a short queue length. Calls may be routed to a specific agent at a specific call center if that agent has a special ability or expertise, such as the ability to speak a foreign language, special training needed for handling complex orders, or a certificate or license for certain transactions. Additionally, real time environmental conditions such as time-of-day, weather, stock market indicators, etc., may be used to define routing attributes, as would be apparent to those skilled in the art. The agent's status (logged on and available, or otherwise) is conveyed to the IIC Data Repository 174 as a state change event. As would be apparent to those skilled in the art, other real-time event information may be utilized to make a routing decision shaped to accomplish a specific purpose, and the specific examples cited are merely illustrative and not exhaustive.

Returning to FIG. 2, step 216, if the Rules Engine 176 is programmed to instruct the Routing Engine 178 not to use historical event data, then the Routing Engine ignores historical event data as a component of the call routing decision. However, if the Rules Engine 176 is programmed to instruct the Routing Engine 178 to use historical event data, then the Routing Engine operates as an history-driven engine, either exclusively or in combination with other routing algorithm components, in accordance with step 218. One exemplary method by which the Rules Engine 176 acquires data so that it may be utilized as a historical event engine is illustrated in FIG. 5.

Figure 5:
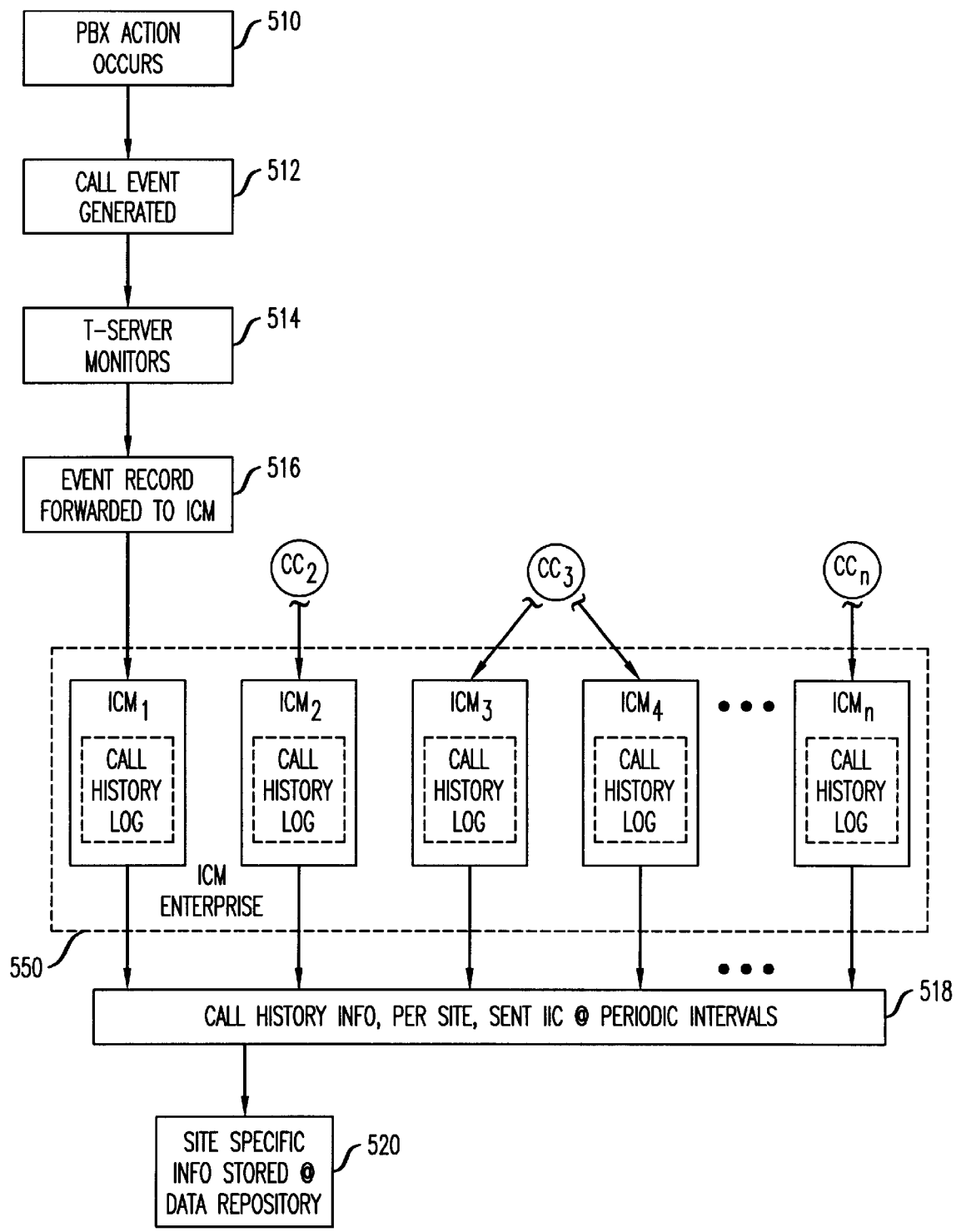
FIG. 5 is a block diagram illustrating an exemplary historical event engine messaging sequence utilized by the Internet Interface Controller (IIC) 170 in determining call routing to an appropriate Enterprise-wide call center, in accordance with the principles of the present invention.

FIG. 5 is a block diagram illustrating an exemplary historical event engine messaging sequence utilized by the Internet Interface Controller (IIC) 170 in determining call routing to an appropriate Enterprise-wise call center, in accordance with the principles of the present invention. Historical event information is monitored by a respective call center's T-server 130 and reported to the call center's Internet Call Manager (ICM) 128 independently, for each call center 120 within the Enterprise-wide domain of call centers. However, in contrast to real-time event data, historical event data does not reflect present call center events or activity. Historical event data may utilize real-time event data, but it uses past real-time event data, often accumulated over periods of time, and is used to analyze past call center activities for the purpose of predicting future call center activities. Historical event data, unlike real-time event data, is not reported to the IIC 170 in response to a state change; rather, historical event data is reported the IIC 170 on a periodic basis to update the historical event information database. Some illustrative examples of historical event data include, but are not limited to, reports of call center densities at various time periods, number of calls serviced per unit time per call center, seasonal variations in call center densities, number of calls abandoned per call center, number of calls processed by a particular application over a given time interval, number of calls received from a particular IP address or URL, customer preference or ordering information, number of times the customer has made a call, call ID/reason, etc.

Assume, in accordance with step 510, that a PBX state change takes place, such as that a particular agent logs on at a call center PBX 122. This state change causes a PBX call event to be generated, in accordance with step 512. The call center T-server 130 detects the call event in accordance with step 514. Subsequently the call center T-server 130 reports the call event to its ICM, in this particular example, $ICM_1$, in accordance with step 516. Upon receiving the call event notification, an ICM records the occurrence locally within its call history log. The ICM call history log maintains summaries of call record details and state change events over a period of time. In accordance with the principles of the present invention, the ICM periodically reports its call history log to the Enterprise Internet Interface Controller (IIC) 170, in accordance with step 518. Site specific historical information is then stored within the IIC Data Repository 174, in accordance with step 520. The Internet Call Managers (ICMs) for each of the call centers included in the Enterprise-wide domain of call centers are shown collectively as the ICM Enterprise 550. As previously described, it should be noted that there is not necessarily a one-to-one correspondence between the number of call centers and the number of ICMs. For example, FIG. 5 includes a total of n Internet Call Managers (ICMs), $ICM_1$ through $ICM_n$. $ICM_1$ is illustrated as being dedicated to a single call center having a single PBX. $ICM_2$ is also shown managing an individual call center ($CC_2$). A single call center may be of such size and magnitude that two or more ICMs ($ICM_3$ and $ICM_4$) may administer distinct subsections of a call center ($CC_4$).

Accumulating historical event data for each call center, Enterprise-wide, at the IIC 170 allows the IIC to determine the most appropriate call route for each individual call based upon that historical data. For example, if the Rules Engine 176 is programmed to value the minimization of caller wait time before an agent responds to a call, then the IIC 170, which possesses historical information pertaining to individual call centers' call densities, makes a routing decision which minimizes or reduces caller wait time, by routing the call to a call center which typically and predictively has an underutilized agent staff available at the particular time the call is initiated. As would be apparent to those skilled in the art, other historical event information may be utilized in making a routing decision shaped to accomplish a specific purpose, and the specific examples cited are merely illustrative and not exhaustive.

Returning to FIG. 2, step 220, if the Rules Engine 176 is programmed to instruct the Routing Engine 178 not to use a call reason in the routing decision, then the Routing Engine ignores any call ID/reason included within the CALL_US request as a component of the call routing decision. However, if the Rules Engine 176 is programmed to instruct the Routing Engine 178 to base a routing decision upon the call ID/reason, then the Routing Engine 176 utilizes the reason for the call, either exclusively or in combination with other routing algorithm components, to route the call, in accordance with step 218. The call ID/reason, in one exemplary embodiment of the present invention and as previously described, is determined when the IIC 170 Listener parses the CALL_US request to determine the call reason associated with the call. Although other schemes may be used, as would be apparent to those skilled in the art, a call reason may be attributable to the Enterprise web-page CGI script from which a request is initiated, and then included as a data field within the CALL_US request by way of operation of the initiating CGI script.

FIG. 6 is an illustration of an exemplary call reason data field structure maintained by the IIC 170. By way of example, if it is determined that the call ID/reason, for a CALL_US request directed to the IIC 170, is set to a first value (1), then the Routing Engine 178 performs the routing decision, either exclusively or in combination with other routing algorithm components, to favor call center site A. Alternatively, if it is determined that the call ID/reason, for a CALL_US request directed to the IIC 170, is set to a second value (2), then the Routing Engine 178 performs the routing decision, either exclusively or in combination with other routing algorithm components, to favor call center site B. The number of alternative call ID/reasons available is determined by the Enterprise's Internet call center management, based upon the Enterprise's needs; therefore, a total of n alternative call ID/reasons are illustrated in FIG. 6. As a specific and tangible example of this type of selective routing based upon the reported call ID/reason, assume that a CALL_US request call ID/reason is the first value (1), and that a value of one indicates that the CALL_US request is being made to procure reservations. Further assume that all Enterprise reservations are made at one particular Enterprise call center, say call center A. Therefore, since reservations may only be made at call center A, the CALL_US request is directed to call center A only. If reservations may be had at other Enterprise call centers as well, then the Rules Engine 176 and the Routing Engine 178 cooperate to select between all reservations-capable call centers and make the ultimate routing decision in view of the call ID/reason in conjunction with other routing algorithm components.

Returning to FIG. 2, step 224, if the Rules Engine 176 is programmed to instruct the Routing Engine 178 not to use identification of the initiating Universal Resource Locator (URL) as a basis for the routing decision, then the Routing Engine disregards the initiating browser URL address as a basis for the call routing decision. However, if the Rules Engine 176 is programmed to instruct the Routing Engine 178 to base a routing decision upon the initiating URL, then the Routing Engine 176 utilizes the URL of the initiating CALL_US request, either exclusively or in combination with other routing algorithm components, to route the call, in accordance with step 222. The initiating URL, in one exemplary embodiment of the present invention and as previously described, is determined when the IIC 170 Listener parses the CALL_US request to determine the URL associated with the call and writes that information to the call record.

FIG. 7 is an illustration of an exemplary URL data field structure maintained by the IIC 170. By way of example, if it is determined that the initiating (source) URL, for a CALL_US request directed to the IIC 170, is set to a first value (say, XYZ), then the Routing Engine 178 performs the routing decision, either exclusively or in combination with other routing algorithm components, to favor call center site A. Alternatively, if it is determined that the initiating URL, for a CALL_US request directed to the IIC 170, is set to a second value (say, CEF), then the Routing Engine 178 performs the routing decision, either exclusively or in combination with other routing algorithm components, to favor call center site B. The number of alternative URLs upon which a routing decision may be based is determined by the Enterprise's Internet call center management, based upon the Enterprise's needs; therefore, a total of n alternative initiating URL addresses are illustrated in FIG. 7. As a specific and tangible example of this type of selective routing based upon the initiating URL address, assume that a CALL_US request has a first initiating URL value (XYZ), and that a value of XYZ indicates that the CALL_US request is being made from the Enterprise's reservations web-page. Further assume that all Enterprise reservations are made at one particular Enterprise call center, say call center A. Therefore, since reservations may only be made at call center A, the CALL_US request is directed to call center A only. If reservations may be had at other Enterprise call centers as well, then the Rules Engine 176 and the Routing Engine 178 cooperate to select between all reservations-capable call centers and make the ultimate routing decision in view of the initiating URL address in conjunction with other routing algorithm components.

Returning to FIG. 2, step 228, if the Rules Engine 176 is programmed to instruct the Routing Engine 178 not to use customer-entered information as a basis for the routing decision, then the Routing Engine disregards the information entered by a caller and contained within the returned CALL_US request. CGI script as a basis for the call routing decision. However, if the Rules Engine 176 is programmed to instruct the Routing Engine 178 to base a routing decision upon customer-entered information, then the Routing Engine 176 utilizes the customer-entered information, either exclusively or in combination with other routing algorithm components, to route the call, in accordance with step 230. The customer-entered information, in one exemplary embodiment of the present invention and as previously described, is determined when the IIC 170 Listener receives and parses the CALL_US request and writes that information to the call record. Customer-entered information may include, but is not limited to, customer data such as: e-mail address, home address, shipping address, daytime and evening phone numbers, credit card information, shipping preferences, consumer preferences, product preferences, family size, household income, and/or any other data which the Enterprise considers useful and pertinent.

FIG. 8 is an illustration of an exemplary customer-entered information data field structure maintained by the IIC 170. By way of example, if a particular data field from the customer-entered information is set to a first value (say, X11), then the Routing Engine 178 performs the routing decision, either exclusively or in combination with other routing algorithm components, to favor call center site A. Alternatively, if it is determined that the particular data field from the customer-entered information is set to a second value (say, X12), then the Routing Engine 178 performs the routing decision, either exclusively or in combination with other routing algorithm components, to favor call center site B. The number of alternative customer-entered information fields, and the number of alternative values for each of those fields, are determined by the Enterprise's management or system administrators, based upon the Enterprise's needs; therefore, a total of n alternative initiating customer-entered information field values are illustrated in FIG. 8. As a specific and tangible example of this type of selective routing based upon the customer-entered information, assume that a CALL_US request includes customer-entered information indicating that the caller wishes to purchase a particular product, indicated by the value of X11 in a customer-entered information field. Further assume that all of the Enterprise's sales for that particular product are made at one particular Enterprise call center, say call center A. Therefore, since that particular product may only be sold by agents staffing call center A, the CALL_US request is directed to call center A only. If that particular product may be sold at other Enterprise call centers as well, then the Rules Engine 176 and the Routing Engine 178 cooperate to select between all call centers selling the product and make the ultimate routing decision in conjunction with other routing algorithm components. Routing decisions may also be made based upon call type, as would be apparent to those skilled in the art. For example, a single call center may be the only call center staffed with agents who can perform text-chat sessions.

Returning to FIG. 2, step 232, the previously described rules are utilized by the Routing Engine 178, using either individual rules exclusively, or two or more rules applied cooperatively by utilizing a rule-blending or weighting algorithm, to determine the appropriate Enterprise-wide call center 120 which will service a call. In accordance with step 234, the IIC 170 Routing Engine 178 creates a routing message containing the Internet Call Manager (ICM) 128 address for the call center 120 determined from the previous step; and returns the routing message to the browser of the caller 110 which initiated the original CALL_US request. The caller's browser is then updated with the ICM address as the pre-routed CALL_US request destination address, in accordance with step 236. The pre-routed CALL_US request is then launched from the caller's browser and received at the destination ICM 128, in accordance with step 238.

When received at the destination ICM 128 for the selected call center 120, the ICM 128 determines the call-type for the pre-routed CALL_US request, in accordance with step 240. If the pre-routed CALL_US request is a Voice over Internet Protocol (VoIP) request, the ICM 128 selects ITG, in accordance with step 246. The ICM 128 then establishes VoIP communication between the caller 110 and the call center 120 Internet Telephony Gateway 126 which connects with the VoIP application on the callers PC, in accordance with step 247. One such VoIP application is as Microsoft® Corporation's NetMeeting®. In a preferred embodiment of the present invention, the VoIP application is an H.323 compliant application. H.323 is the International Telecommunications Union Telecommunications (ITU-T) standard defining a set of call control, channel setup and codec specifications for transmitting real-time voice and video over networks that doesn't offer guaranteed service or quality of service—such as packet networks, and in particular, the Internet, Local Area Networks (LANs), Wide Area Networks (WANs), and intranets. In accordance with step 248, the call is then launched by the call center ICM 128 from the ITG 126 to the call center Private Branch Exchange (PBX) 122 via the port side facility 146 (typically an ISDN/PRI interface).

If, however, the determination made in step 240 establishes that the incoming pre-routed CALL_US request is not a Voice over Internet Protocol (VoIP) request, nor a text-chat request, nor a chat & call-back request (therefore a call-back only request), the ICM 128 does not launch a call control application back to the caller 110. Otherwise, a call control application is launch back to the call 110, in accordance with step 242. The call control application is an application which allows the caller 110 and an agent at the call center 120 to exchange text-chat messages, share URLs and to otherwise collaborate, once a session is established between the caller and the agent. Simultaneously, for text-chat or call-back, the ICM 128 launches the call to the PBX 122 over a well-known phantom call facility, in accordance with step 244. The so-called phantom call does not utilize the ISDN/PRI port side facility; rather it is a method for reserving an agent without establishing a voice connection, resulting in a greater call capacity for the call center 120.

Irrespective of the type of call request; whether VoIP, text-chat, or call-back; the Internet Call Manager (ICM) 128 for the call center 120 to which an incoming call is directed determines, via the PBX or switch, if a call center agent is available to service the incoming call, in accordance with step 250. If an agent is not available, then the incoming call is queued at the PBX or switch, until an agent does become available, in accordance with step 252. If an agent is available, the ICM 128 is notified of the chosen agent ID, in accordance with step 254. A connection is then established between the caller 110 and the agent; a screen pop including pertinent caller information launched to the agent's workstation 132, in accordance with step 256, and a caller/agent session is synchronized through the ICM 128.

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method of assigning a contact request, initiated by a caller utilizing a browser, to a call center selected from a plurality of call centers, said method comprising the steps of:

receiving said contact request;

creating a call record;

parsing said contact request, including parsing an IP address, a universal resource locator, and a call type of the request to determine a type value associated with a request type field;

storing in the call record said IP address if said IP address is valid and storing in the call record said universal resource locator and said call type if said universal resource locator and said call type are non-zero values;

establishing a call with said call center, said call type dependent upon said type value, wherein a text-chat session is established for said call with said call center if said IP address is not valid and if said universal resource locator and said call type are not non-zero values;

dipping a database to access an applicable rule from a set of rules;

applying said applicable rule to said contact request to select said call center from said plurality of call centers; and returning an address associated with said call center to said browser initiating said contact request.

2. The method in accordance with claim 1 wherein a first type value is utilized to establish a Voice over Internet Protocol (VoIP) session for said call with said call center.

3. The method in accordance with claim 1 wherein a second type value is utilized to establish a text-chat session for said call with said call center.

4. The method in accordance with claim 1 wherein a third type value is utilized to request a call-back session for said call with said call center.

5. The method in accordance with claim 1 further comprising the steps of:
receiving real-time event information from said plurality of call centers; and
applying said real-time event information, in conjunction with said applicable rule, to said contact request to select said call center from said plurality of call centers.

6. The method in accordance with claim 1 further comprising the steps of:
receiving historical event information from said plurality of call centers; and
applying said historical event information, in conjunction with said applicable rule, to said contact request to select said call center from said plurality of call centers.

7. The method in accordance with claim 1 wherein said applicable rule utilizes the Universal Resource Locator (URL) associated with said browser to select said call center from said plurality of call centers.

8. The method in accordance with claim 1 wherein said applicable rule utilizes a call reason value included within said contact request to select said call center from said plurality of call centers.

9. The method in accordance with claim 1 wherein said applicable rule utilizes a caller entered information value included within said contact request to select said call center from said plurality of call centers.

10. A device for assigning a contact request, initiated by a caller utilizing a browser, to a call center selected from a plurality of call centers, said device comprising:
a listening device operable to receive said contact request, create a call record, parse an IP address, a universal resource locator, and a call type of said contact request, store said IP address in said call record if said IP address is valid, and store said universal resource locator and said call type in said call record if said universal resource locator and said call type are non-zero values;
a data repository, operable to receive pertinent call center data from said listening device and pertinent contact request data from said caller; and
a routing engine, operable to read said pertinent call center data and pertinent contact request data from said data repository, said routing engine adapted to apply a set of rules to said pertinent call center data and said pertinent contact request data to determine said call center selected from said plurality of call centers.

11. The device in accordance with claim 10 wherein said contact request data includes a field specifying that a subsequently established call session is a Voice over Internet Protocol (VoIP) session.

12. The device in accordance with claim 10 wherein said contact request data includes a field specifying that a subsequently established call session is a text-chat session.

13. The device in accordance with claim 10 wherein said contact request data includes a field specifying that a subsequently established call session is a call-back session.

14. A device for assigning a contact request, initiated by a caller utilizing a browser, to a call center selected from a plurality of call centers, said device comprising:
means for receiving said contact request;
means for parsing said contact request to determine a type value associated with a request type field, by creating a call record, parsing an IP address, a universal resource locator, and a call type of the request, storing said IP address in said call record if said IP address is valid and storing said universal resource locator and said call type in said call record if said universal resource locator and said call type are non-zero values in the call record;
means for establishing a call with said call center, said call type dependent upon said type value, wherein a text-chat session is established for said call with said call center if said IP address is not valid and if said universal resource locator and said call type are not non-zero values;
means for dipping a database to access an applicable rule from a set of rules;
means for applying said applicable rule to said contact request to select said call center from said plurality of call centers; and
means for returning an address associated with said call center to said browser initiating said contact request.

15. The device in accordance with claim 14 wherein a first type value is utilized to establish a Voice over Internet Protocol (VoIP) session for said call with said call center.

16. The device in accordance with claim 14 wherein a second type value is utilized to establish a text-chat session for said call with said call center.

17. The device in accordance with claim 14 wherein a third type value is utilized to request a call-back session for said call with said call center.

18. The device in accordance with claim 14 further comprising:
means for receiving real-time event information from said plurality of call centers; and
means for applying said real-time event information, in conjunction with said applicable rule, to said contact request to select said call center from said plurality of call centers.

19. The device in accordance with claim 14 further comprising:
means for receiving historical event information from said plurality of call centers; and
means for applying said historical event information, in conjunction with said applicable rule, to said contact request to select said call center from said plurality of call centers.

20. The device in accordance with claim 14 wherein said applicable rule utilizes the Universal Resource Locator (URL) associated with said browser to select said call center from said plurality of call centers.

21. The device in accordance with claim 14 wherein said applicable rule utilizes a call reason value included within said contact request to select said call center from said plurality of call centers.

22. The device in accordance with claim 14 wherein said applicable rule utilizes a caller entered information value included within said contact request to select said call center from said plurality of call centers.

23. A method of assigning a contact request, initiated by a caller utilizing a browser, to a call center selected from a plurality of call centers, said method comprising the steps of:
formulating a set of rules to determine call routing to said plurality of call centers, the set of rules including using an engine associated with each of historical event data, a call reason, a universal resource locator routing, and caller-entered information;
storing said set of rules within a database;
receiving said contact request;

reading said database to access a first applicable rule from said set of rules;

reading said database to access a second applicable rule from said set of rules;

applying said first applicable rule and said second applicable rule to said contact request, utilizing a rule-blending algorithm, to select said call center from said plurality of call centers; and returning an address associated with said call center to said browser initiating said contact request.

24. A method of establishing an Internet call connection between a caller utilizing a web-based browser and an Internet call center incorporated within an enterprise having a plurality of Internet call centers, said method comprising the steps of:

formulating a set of rules to determine call routing to said plurality of Internet call centers, the set of rules including using an engine associated with each of historical event data, a call reason, a universal resource locator routing, and caller-entered information;

storing said set of rules within a database included within an Internet Interface Controller; launching a contact request over the Internet from said web-based browser;

receiving said contact request at said Internet Interface Controller;

parsing pertinent routing information from said contact request;

reading said database to access a first applicable rule from said set of rules;

reading said database to access a second applicable rule from said set of rules;

applying said first applicable rule and said second applicable rule to said pertinent routing information, utilizing a rule-blending routing engine, to select said call center;

launching a message including an address associated with said call center to, said web-based browser;

receiving said message at said web-based browser;

creating a modified pre-routed contact request, said modified pre-routed contact request including said address associated with said call center as the destination address;

launching said modified pre-routed contact request over the Internet from said web-based browser;

receiving said modified pre-routed contact request at said call center; and establishing, responsive to receipt of said modified pre-routed contact request at said call center, an Internet call connection between said caller and said call center.

25. A method of assigning a contact request, initiated by a caller utilizing a browser, to a call center selected from a plurality of Enterprise-wide call centers, said method comprising the steps of:

formulating a set of rules to determine call routing to said plurality of Enterprise-wide call centers, the set of rules including using an engine associated with each of historical event data, a call reason, a universal resource locator routing, and caller-entered information;

storing said set of rules within a database;

receiving said contact request;

reading said database to access a applicable rule from said set of rules;

applying said applicable rule to said contact request to select said call center from said plurality of Enterprise-wide call centers; and returning an address associated with said call center to said browser initiating said contact request.

* * * * *